(12) United States Patent
Liu et al.

(10) Patent No.: US 8,902,706 B2
(45) Date of Patent: Dec. 2, 2014

(54) TECHNIQUE AND APPARATUS FOR SEISMIC DATA QUALITY CONTROL USING NON-LINEAR REGRESSION ANALYSIS

(75) Inventors: Qinglin Liu, Oslo (NO); Kambiz Iranpour, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 496 days.

(21) Appl. No.: 12/694,384

(22) Filed: Jan. 27, 2010

(65) Prior Publication Data

US 2011/0182143 A1    Jul. 28, 2011

(51) Int. Cl.
*G01V 1/30* (2006.01)
(52) U.S. Cl.
CPC . *G01V 1/30* (2013.01); *G01V 1/307* (2013.01); *G01V 2210/632* (2013.01)
USPC .................................. 367/47; 367/38; 702/14
(58) Field of Classification Search
CPC .......................... G01V 1/307; G01V 2210/632
USPC ......................................... 367/38, 47; 702/14
See application file for complete search history.

(56) References Cited

U.S. PATENT DOCUMENTS

| 4,359,766 A * | 11/1982 | Waters et al. ................... 367/38 |
| 5,661,697 A * | 8/1997 | Swan et al. ...................... 367/47 |
| 2006/0282220 A1* | 12/2006 | Young et al. ...................... 702/14 |
| 2010/0065278 A1* | 3/2010 | Burtz ............................ 166/369 |

OTHER PUBLICATIONS

Oz Yilmaz, "Seismic Data Analysis, Processing, Inversion, and Interpretation of Seismic Data," vol. 1, Society of Exploration Geophysicists, 11 pages (title page, first page Table of Contents, pp. 81-89).

\* cited by examiner

*Primary Examiner* — Ian J Lobo

(57) ABSTRACT

A technique includes receiving seismic data acquired in a seismic survey. The technique includes determining a geophysical trend of trace amplitudes indicated by the seismic data based on non-linear regression and performing quality control analysis on the seismic data based on the determined trend.

18 Claims, 7 Drawing Sheets

TECHNIQUE AND APPARATUS FOR SEISMIC DATA QUALITY CONTROL USING NON-LINEAR REGRESSION ANALYSIS

BACKGROUND

The invention generally relates to a technique and apparatus for seismic data quality control using non-linear regression analysis.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes receiving seismic data acquired in a seismic survey. The technique includes determining a geophysical trend of trace amplitudes indicated by seismic data based on non-linear regression and performing quality control analysis on the seismic data based on the determined trend.

Advantages and other features of the invention will become apparent from the following drawing, description and claims.

DETAILED DESCRIPTION

A seismic survey may be performed in a marine or land environment using one of a number of different seismic survey systems. As an example, FIG. 1 depicts an exemplary land-based vibroseis acquisition system 8 in accordance with some embodiments of the invention.

Figure 1:
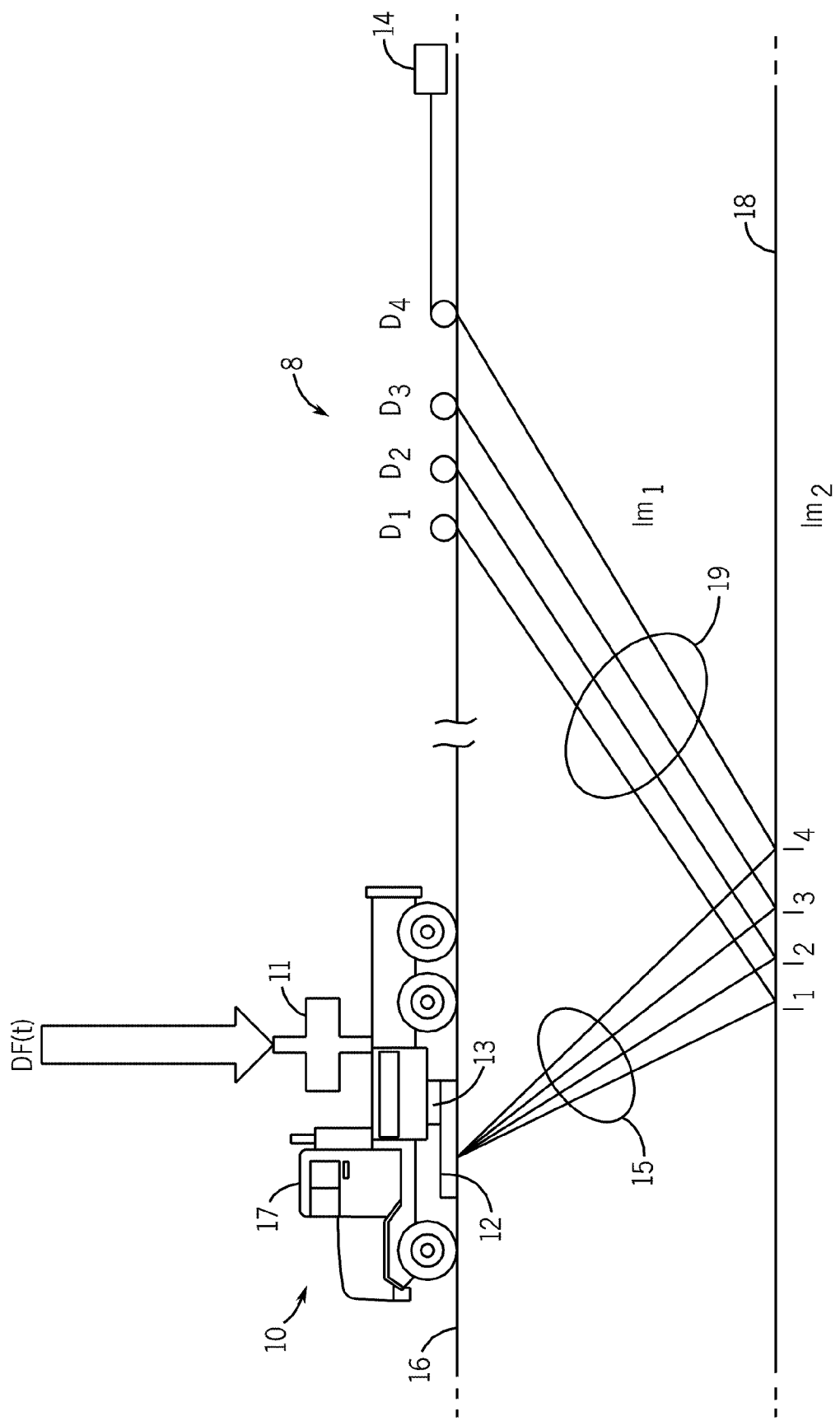
FIG. 1 a schematic diagram of a vibroseis acquisition system according to an embodiment of the invention.

The system 8 includes multiple seismic vibrators 10 (one of which is depicted in FIG. 1); surface-located geophones $D_1$, $D_2$, $D_3$ and $D_4$; and a data acquisition system 14. As part of operations associated with a vibroseis survey, the seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The geophones $D_1$, $D_2$, $D_3$ and $D_4$ acquire measurements of sweeps that are generated by other seismic vibrators 10, as described further below. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15.

Among its other features, the seismic vibrator 10 may include a signal measuring apparatus 13, which includes sensors (accelerometers, for example) to measure the signal 15 (i.e., to measure the output ground force of the seismic vibrator 10). As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep, the frequency of the DF(t) signal transitions (and thus, the oscillation frequency of the reaction mass transitions) over a range of frequencies, one frequency at time. The amplitude of the DF(t) signal may be linearly or non-linearly varied during the generation of the sweep pursuant to a designed amplitude-time envelope.

It is noted that unlike the seismic vibrator 10, a seismic vibrator may alternatively be constructed to be located in a borehole, in accordance with other embodiments of the invention. Thus, seismic sensors, such as geophones, may alternatively be disposed in a borehole to record measurements produced by energy that is injected by borehole-disposed vibrators. Although specific examples of surface-located seismic vibrators and seismic sensors are described herein, it is understood that the seismic sensors and/or the seismic vibrators may be located downhole in accordance with other embodiments of the invention.

Additionally, the techniques and systems that are disclosed herein may be applied to other types of survey systems, such as towed marine survey systems, seabed cable survey systems, etc. Thus, many variations are contemplated and are within the scope of the appended claims.

Seismic data quality control techniques typically are applied in the field for purposes of assuring high quality data for exploration and reservoir characterization. Traditional seismic data quality control involves applying a linear regression analysis to the seismic data for purposes of sorting out noisy or weak seismic traces from the remaining traces.

More specifically, conventional linear regression analysis typically involves determining a linear trend in a plot of the logarithmic root mean square (RMS) trace amplitude versus the logarithmic sensor offset. The determined linear trend is used to reveal a geophysical trend of the raw shot gather and allows traces to be judged as relatively weak or noisy based on this trend. In this manner, thresholds may be constructed above and below the determined trend for purposes of constructing a filter to reject the noisy and weak traces that fall outside of these thresholds.

It has been discovered, however, that the geophysical trend of the raw shot gather is not necessarily linear, especially at the near and far sensor offsets. In this manner, at the near sensor offsets, which are close to the seismic source, the trace amplitudes may depart from the linear trend due to the strength of the source at these offsets. At the far sensor offsets, which are farthest away from the seismic source, the trace amplitudes have relatively low signal-to-noise ratios (SNRs). These factors mean that otherwise valid traces may be rejected based on a linear regression-based quality control analysis, as the actual trend of the raw shot gather proximate to the near and far offsets is not linear with respect to the trend of the amplitudes at sensor offsets in between. Thus, it has been discovered that the traditional approach may be insufficient for sorting out weak or noisy traces at the near and far offsets.

Figure 2:
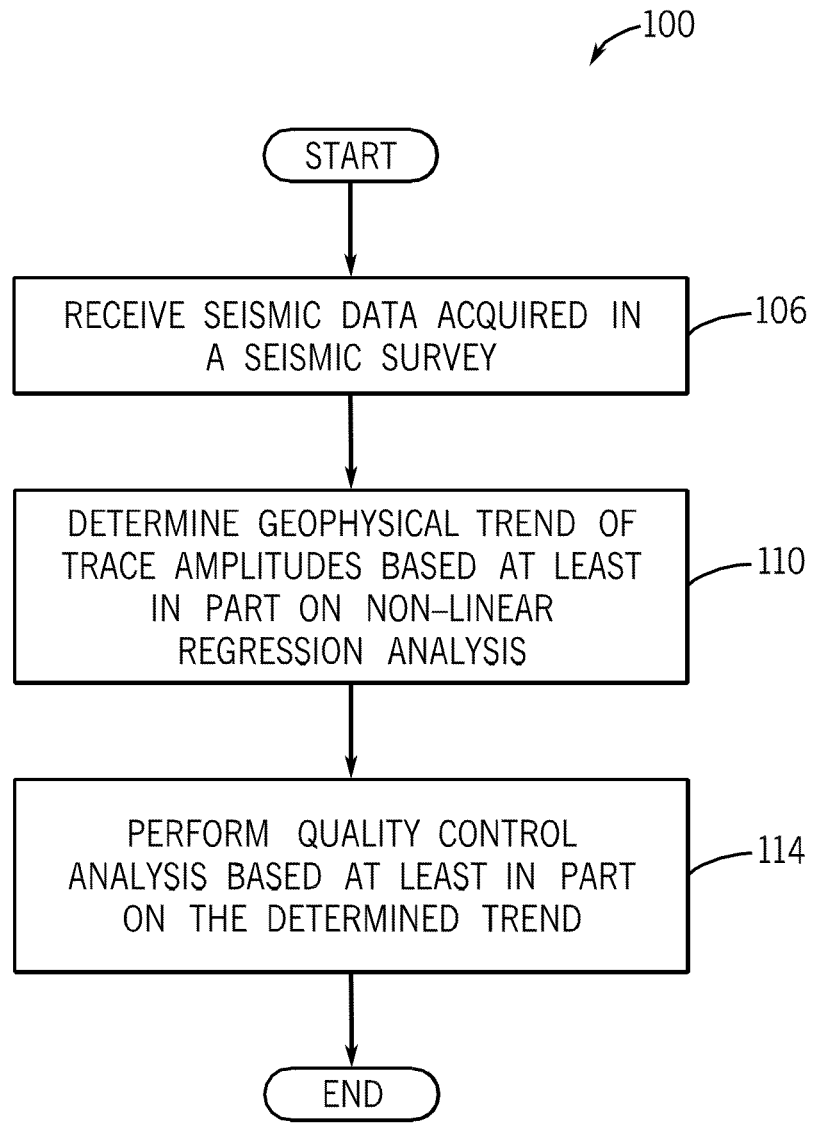
FIGS. 2 and 3 are flow diagrams depicting seismic data quality control techniques according to embodiments of the invention.

In accordance with embodiments of the invention described herein, a technique 100, which is depicted in FIG. 2, may be used for seismic data quality control to overcome the challenges faced by traditional linear regression-based quality control approaches. The technique 100 uses non-linear regression analysis to determine a geophysical trend in the trace amplitudes to properly account for both near and far sensor offset data properly, without inappropriately misjudging traces as being noisy or weak.

Pursuant to the technique 100, seismic data are received (block 106), which have been acquired by seismic sensors in a seismic survey. The seismic survey may be a land-based seismic survey or a marine-based seismic survey, depending on the particular embodiment of the invention. Regardless of the particular form of the survey, the acquired seismic data indicate trace amplitudes at different sensor offsets. The technique 100 includes determining (block 110) a geophysical trend of trace amplitudes indicated by the seismic data based at least in part on a non-linear regression analysis. Quality control analysis is then performed (block 114) based on the determined trend.

Figure 3:
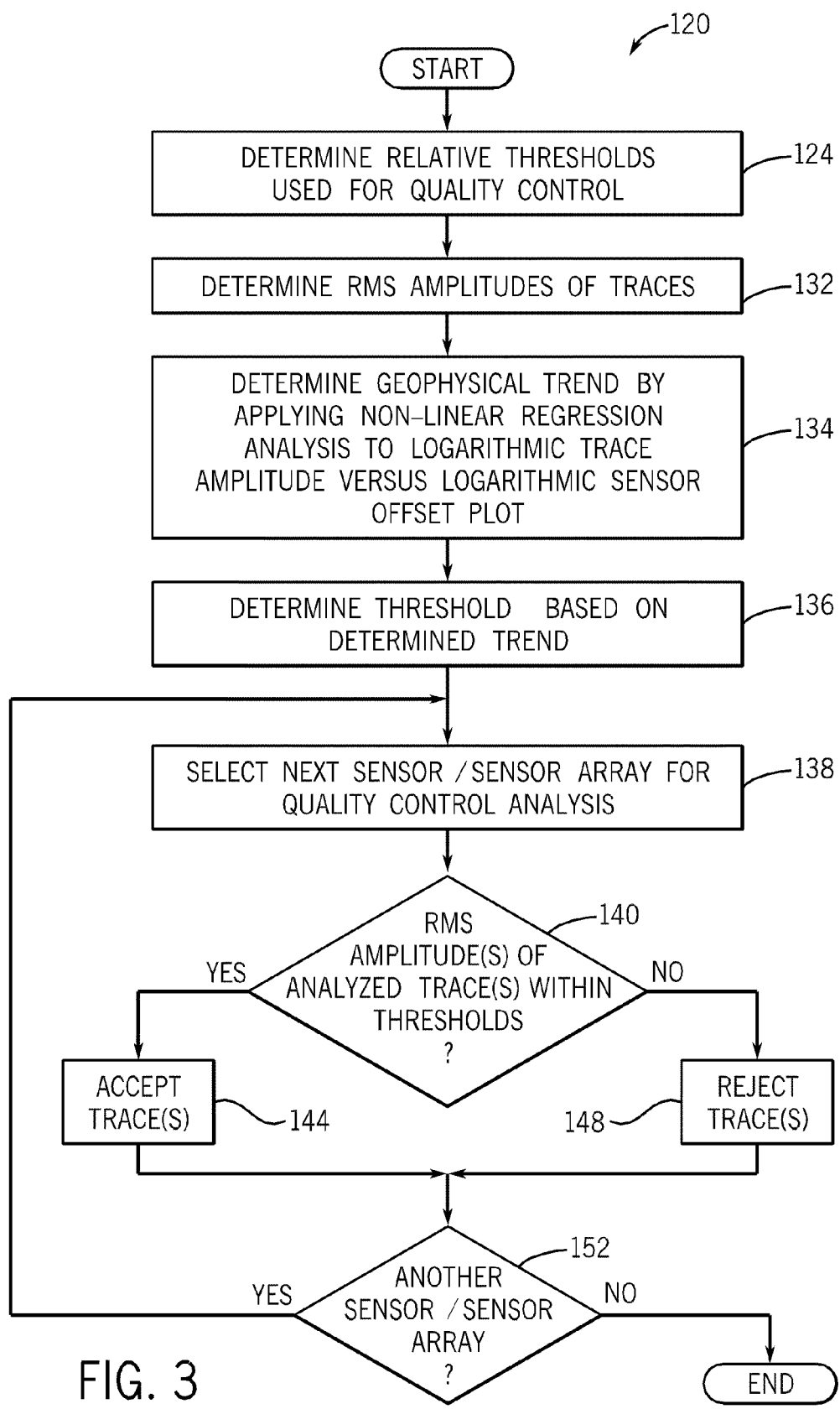

Referring to FIG. 3, as a more specific example, a technique 120 may be used for purposes of filtering out weak or noisy seismic traces for purposes of performing seismic data quality control. The evaluated traces may be traces of individual sensors, as well as traces from a predetermined group or array of sensors. Pursuant to the technique 120, thresholds are determined (block 124) relative to the geophysical trend to be determined (as described below). As non-limiting examples, the thresholds may be absolute thresholds above and below the determined trend; percentage thresholds above and below the determined trend; or some other relationship to establish upper and lower boundaries for filtering out the weak or noisy traces from the remaining traces.

The technique 120 includes determining the root mean square (RMS) amplitudes of the traces, pursuant to block 132. In this manner, the RMS amplitude of each trace may be determined over a pre-determined window of time, in accordance with some embodiments of the invention.

The technique 120 next includes determining (block 134) the geophysical trend of the trace amplitudes by applying non-linear regression analysis to plot of the logarithmic trace amplitude versus the logarithmic sensor offset. In this manner, the non-linear regression analysis models the trend as a non-linear function, which may be, as non-limiting examples, an exponential function, a logarithmic function, a trigonometric function, a power series function or a combination of one or more of these functions. Other types of non-linear functions may be used in other embodiments of the invention, as can be appreciated by the skilled artisan. The specific parameters of the non-linear function may be determined by "fitting" the function to plot, by applying a curve fitting technique (a least squares technique, as a non-limiting example) to minimize the residuals between the plot and the non-linear function.

After the geophysical trend is determined pursuant to block 134, thresholds are then set, pursuant to block 136, based on the determined trend for purposes of establishing filtering boundaries to guide the acceptance or rejection of the traces.

The analysis of traces from a particular sensor or sensor array begins in block 138 in which the next sensor/sensor array is selected for quality control analysis. The selection of the sensor/sensor array results in one or more traces, whose amplitudes are analyzed for purposes of determining whether or not the traces should be rejected. In this regard, the technique 120 includes determining (diamond 140) whether the logarithmic RMS amplitude(s) of the analyzed trace(s) are within the thresholds. If so, then the trace(s) are accepted, pursuant to block 144. Otherwise, the trace(s) are rejected, pursuant to block 148.

The technique 120 proceeds through the other traces in a similar manner by selecting another sensor/sensor array and determining whether the trace(s) associated with the array need to be analyzed pursuant to a quality control technique, pursuant to diamond 152. If so, control returns to block 138.

Figure 4:
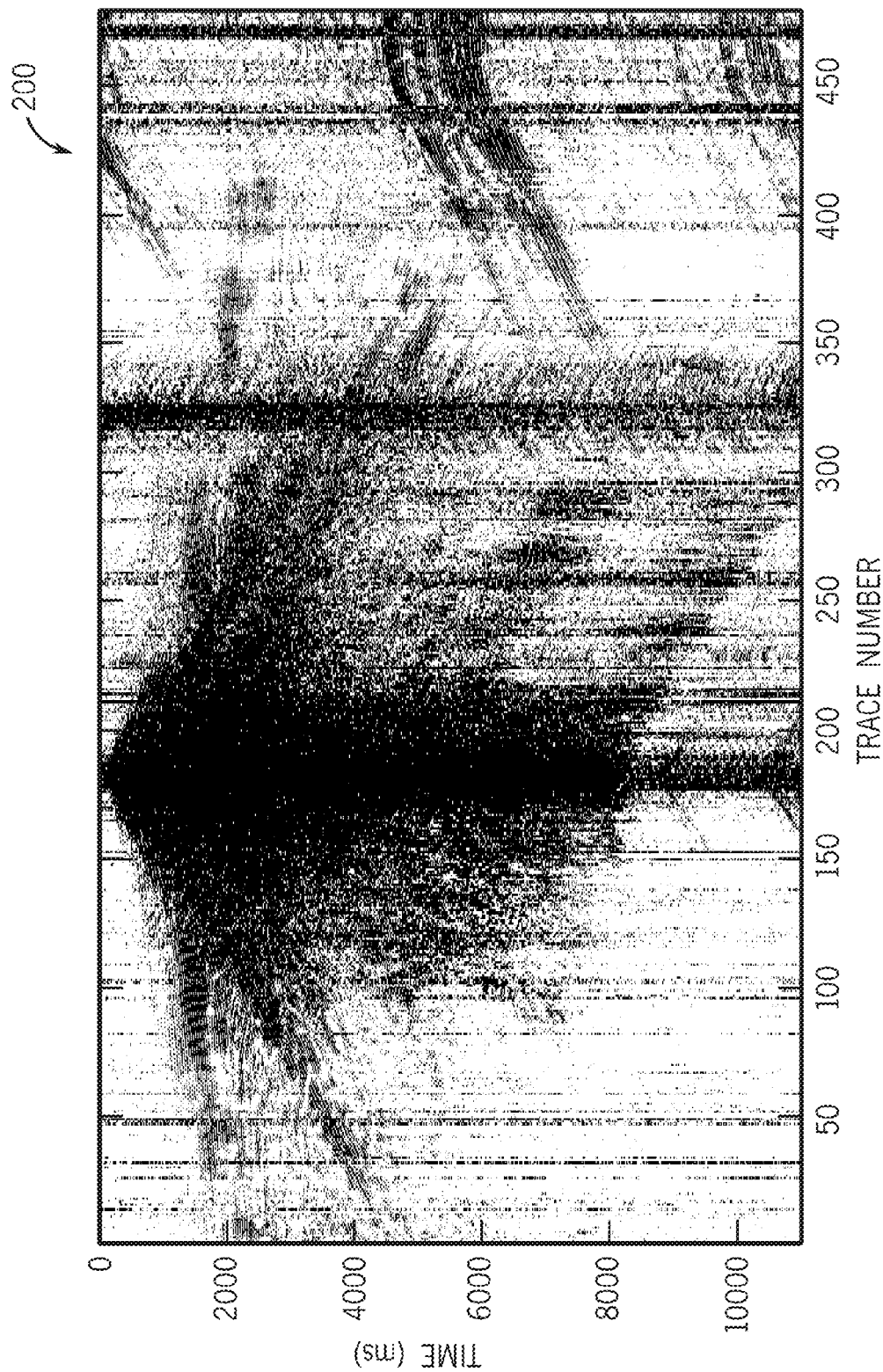
FIG. 4 is an illustration of a simulated two-dimensional shot record according to an embodiment of the invention.

As a non-limiting example, FIG. 4 depicts a simulated two-dimensional (2-D) shot record 200 with uncorrelated data. From this record 200, a plot 224 may be constructed of the logarithmic trace amplitude versus the logarithmic sensor offset, as depicted in FIG. 5.

Figure 5:
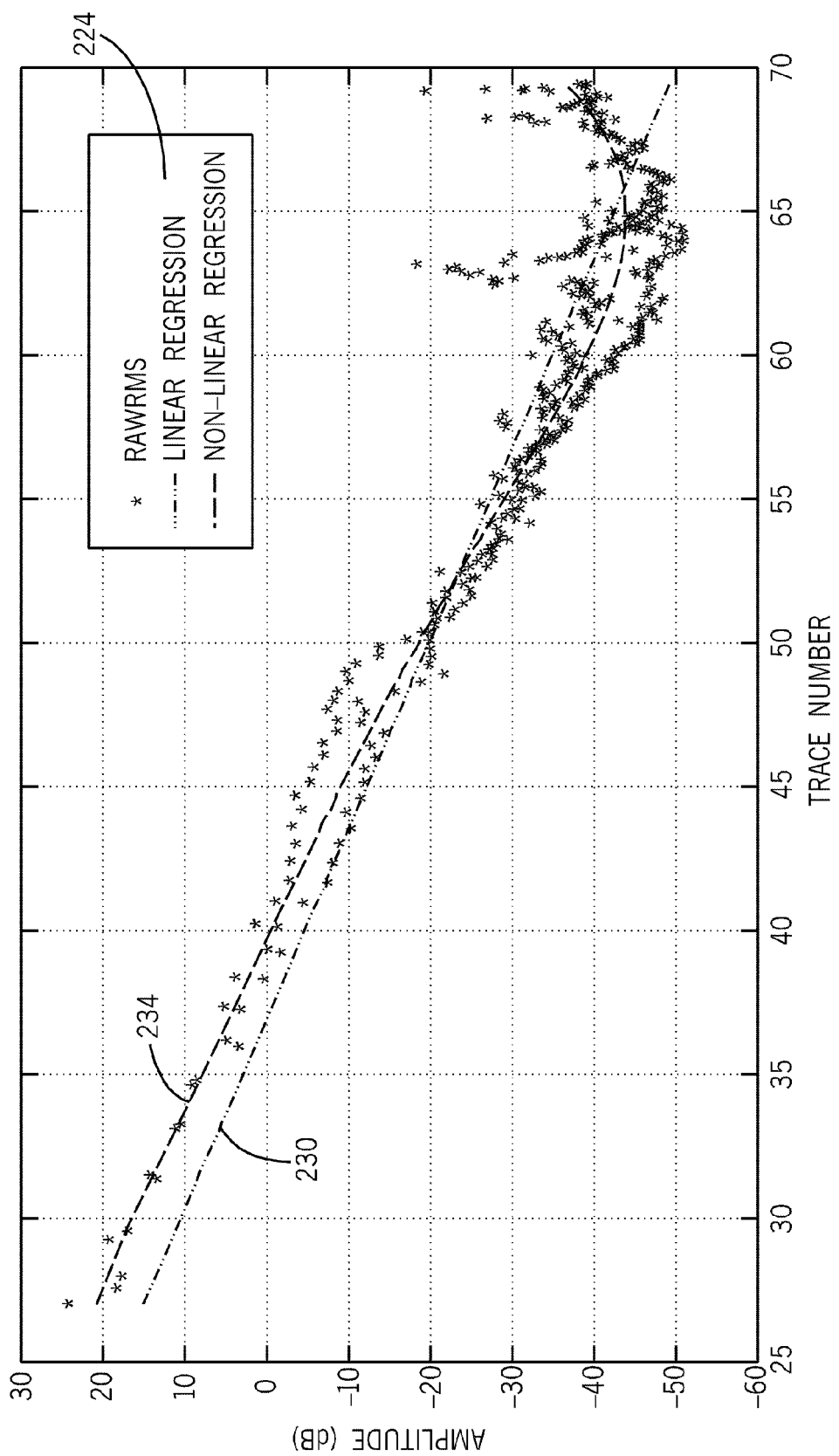
FIG. 5 is a plot of logarithmic root mean square amplitude versus logarithmic offset illustrating linear and non-linear regression trends.

FIG. 5 graphically illustrates the difference between a linear regression-derived geophysical trend (represented by a line 230) and a non-linear regression-derived geophysical trend (represented by a non-linear curve 234). In this manner, as illustrated in FIG. 5, at the near and far offsets, the line 230 does not closely follow the plot 224. However, the non-linear curve 234 closely follows the plot 224 both at the far and near offsets and at offsets in between. Therefore, the non-linear curve 234 is a more accurate representation of the geophysical trend, which when used in combination with relative thresholds may be used to reject noisy and weak traces.

Figure 6:
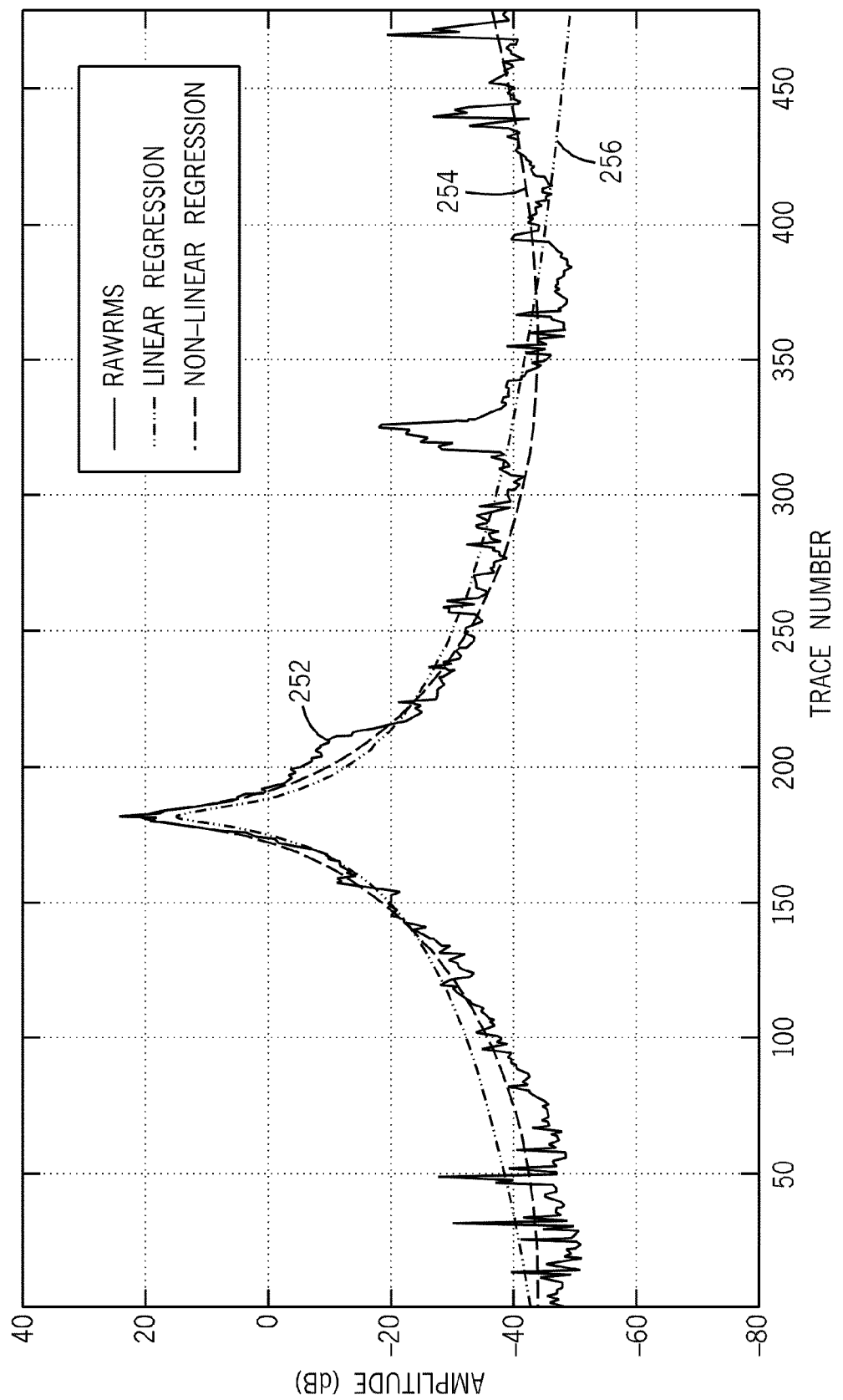
FIG. 6 is a plot of logarithmic root mean square amplitude versus offset illustrating linear and non-linear regression trends.

FIG. 6 illustrates a plot 252 of the logarithmic RMS trace amplitude versus the sensor offset for the 2-D seismic data derived from the shot record 200 of FIG. 4. As can be seen, a corresponding non-linear regression-derived curve 254 more closely follows the plot 252, as compared to a linear regression-derived curve 256. Furthermore, the curve 254 more closely follows the plot 252 as the far and near offsets.

Figure 7:
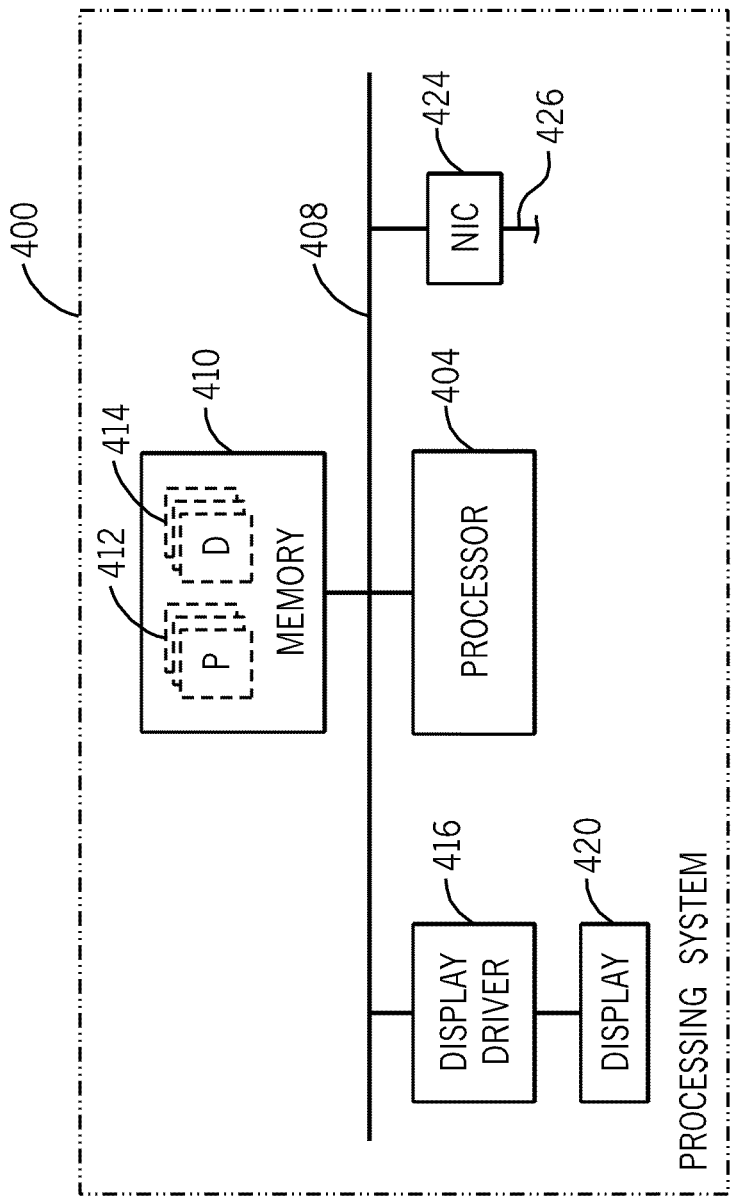
FIG. 7 is a schematic diagram of a processing system according to an embodiment of the invention.

Referring to FIG. 7, in accordance with some embodiments of the invention, a processing system 400 may be used for purposes of performing the seismic data quality control analysis that is disclosed herein. It is noted that the architecture of the processing system 400 is illustrated merely as an example, as the skilled artisan would recognize many variations and deviations therefrom.

In the example that is depicted in FIG. 7, the processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to perform all or parts of the techniques 100 and/or 120, in accordance with some embodiments of the invention.

The memory 410 may also store datasets 414 which may be initial, intermediate and/or final datasets produced by the processing of the techniques 100 and/or 120 by the processor 404. For example, the datasets 414 may include data indicative of seismic data, RMS amplitudes, a geophysical trend of the raw shot gather derived from the application of non-linear regression analysis, parameters associated with the determined geophysical trend, upper and lower trace amplitude rejection thresholds, identities of accepted or rejected traces, etc.

As depicted in FIG. 7, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving seismic data. As also depicted in FIG. 7, a display 420 of the processing system 408 may display initial, intermediate or final results produced by the processing system 400. In general, the display 420 may be coupled to the system 400 by a display driver 416. As a non-limiting example, the display 420 may display an image, which graphically depicts RMS amplitude versus sensor offset graphs, logarithmic RMS amplitude versus logarithmic offset graphs, logarithmic RMS amplitude versus offset graphs, non-linear regression-derived geophysical trends, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving seismic data acquired in a seismic survey and representing trace amplitudes, the trace amplitudes being associated with sensor offsets and having a geophysical trend;
   determining the geophysical trend of the trace amplitudes to account for a non-linearity of the geophysical trend with respect to the sensor offsets, the determining comprising processing the seismic data in a processor-based machine to apply a non-linear regression to the trace amplitudes; and
   performing quality control analysis on the seismic data based at least in part on the determined trend.

2. The method of claim 1, wherein the act of performing quality control analysis comprises selectively accepting or rejecting a given trace indicated by the seismic data based on a comparison of an amplitude of the trace with the determined trend.

3. The method of claim 2, further comprising determining an amplitude of the given trace, comprising determining a root mean square amplitude over a predetermined window of time.

4. The method of claim 1, wherein the act of determining the trend comprises determining a plot of logarithmic amplitude versus logarithmic sensor offset and determining a non-linear regression-derived curve based on the plot.

5. The method of claim 1, wherein the act of performing quality control analysis comprises:
   establishing at least one threshold relative to the determined trend;
   comparing an amplitude of a given trace indicated by the seismic data to said at least one threshold; and
   selectively accepting or rejecting the given trace based on the comparison.

6. A system comprising:
   an interface to receive seismic data acquired in a seismic survey, the seismic data representing trace amplitudes, the trace amplitudes being associated with sensor offsets and having a geophysical trend; and
   a processor to apply a non-linear regression to the trace amplitudes to determine the geophysical trend of the trace amplitudes to account for a non-linearity of the geophysical trend with respect to the sensor offsets, and perform quality control analysis on the seismic data based at least in part on the determined trend.

7. The system of claim 6, wherein the processor is adapted to selectively accept or reject a given trace indicated by the seismic data based on a comparison of an amplitude of the trace with the determined trend.

8. The system of claim 7, wherein the processor is adapted to determine the amplitude of the given trace by determining a root mean square amplitude over a predetermined window of time.

9. The system of claim 6, wherein the processor is adapted to determine a plot of logarithmic amplitude versus logarithmic sensor offset and determine a non-linear regression-derived curve based on the plot.

10. The system of claim 6, wherein the processor is adapted to establish at least one threshold relative to the determined trend, compare an amplitude of a given trace to said at least one threshold and selectively accept or reject the given trace based on the comparison.

11. An article comprising a computer readable storage medium storing instructions that when executed by a computer cause the computer to:
   receive seismic data acquired in a seismic survey and representing trace amplitudes, the trace amplitudes being associated with sensor offsets and having a geophysical trend;
   apply a non-linear regression to determine the geophysical trend of the trace amplitudes to account for a non-linearity of the geophysical trend with respect to the sensor offsets; and perform quality control analysis on the seismic data based at least in part on the determined trend.

12. The article of claim 11, the storage medium storing instructions that when executed by the computer cause the computer to selectively accept or reject a given trace indicated by the seismic data based on a comparison of an amplitude of the trace with the determined trend.

13. The article of claim 12, the storage medium storing instructions that when executed by the computer cause the computer to determine the amplitude of the given trace by determining a root mean square amplitude over a predetermined window of time.

14. The article of claim 11, the storage medium storing instructions that when executed by the computer cause the computer to determine a plot of logarithmic amplitude versus logarithmic sensor offset and determine a non-linear regression-derived curve based on the plot.

15. The article of claim 11, the storage medium storing instructions that when executed by the computer cause the computer to establish at least one threshold relative to the determined trend, compare an amplitude of a given trace indicated by the seismic data to said at least one threshold and selectively accept or reject the given trace based on the comparison.

16. A method comprising:
processing data representing traces acquired in a seismic survey in a processor-based machine to determine, for each trace, a plot of a logarithm of an amplitude of the trace versus a logarithm of an associated sensor offset;
applying non-linear regression to the plots to determine a non-linear trend of the plots as a function of sensor offset; and
performing quality control analysis on the traces based at least in part on a relationship of the trace amplitudes to the determined non-linear trend.

17. The method of claim 16, wherein performing quality control analysis comprises selectively accepting and rejecting the traces based at least in part on the determined non-linear trend.

18. The method of claim 16, further comprises using the non-linear regression to account for a lower level of sensor acquired noise at a far sensor offset than a level of sensor acquired noise at a relatively closer sensor offset.

\* \* \* \* \*